Figures 1, 2:
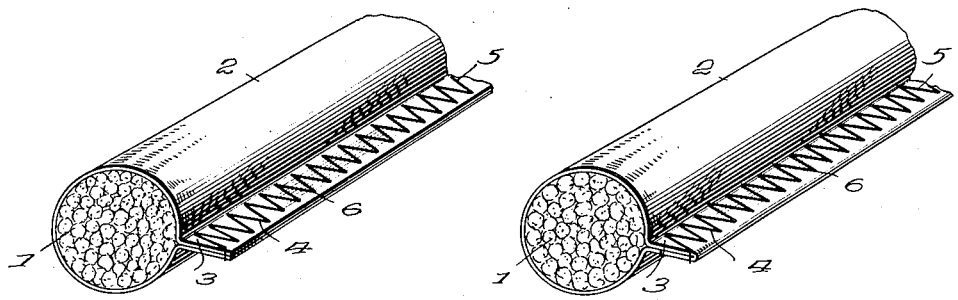
Figures 3, 4:
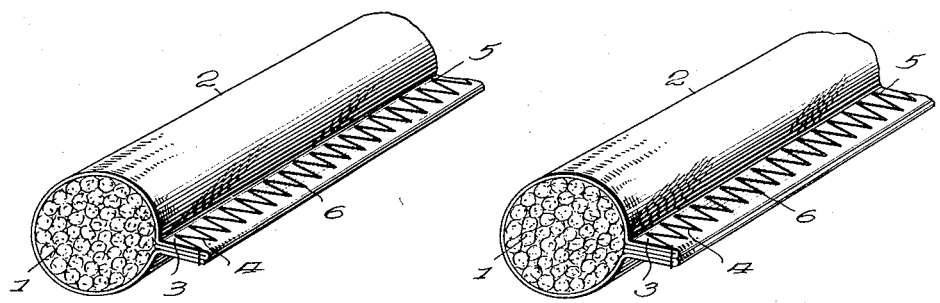
Figure 5:
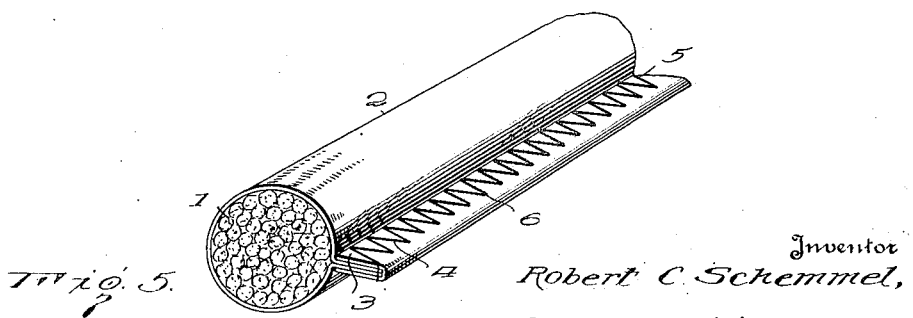

June 24, 1930.  R. C. SCHEMMEL  1,765,884
GASKET
Filed Nov. 7, 1929

Inventor
Robert C. Schemmel,
By Dyre and Kirchner
His Attorneys

Patented June 24, 1930

1,765,884

UNITED STATES PATENT OFFICE

ROBERT C. SCHEMMEL, OF UNION CITY, INDIANA

GASKET

Application filed November 7, 1929. Serial No. 405,468.

My invention relates to improvements in gaskets and/or weatherstripping primarily adapted to be interposed between a door jamb and a swinging door to insulate the inside of the door from the outside and prevent heat transfer through the space between the meeting edges of the door and jamb, whether by conduction or convection.

A principal object of my invention is to provide a gasket of the character indicated which includes a soft yielding packing material of substantially cylindrical form enveloped within a covering fabric to maintain the shape of the packing and prevent deterioration of the same by the action of air, moisture, etc.

Another object of the invention is to form the fabric envelope with an outwardly projecting side flange or lap adapted to receive tacks or the like whereby the gasket may be secured to the door jamb or the door without penetration or mutilation of the packing material.

More particularly, one of the principal objects is to provide an inexpensive and quickly fabricated flange or lap which will be characterized by an unusual degree of stiffness or "body" without the necessity of forming the flange of any more than a minimum number of plies.

As heretofore commonly constructed the flange in question is integral with and an elongation of the fabric envelope which encases the cylindrical packing. The packing encasing portion of this fabric may be quite thin and limp without sacrificing any of its efficiency, and consequently, if it were not for the necessity of attaining a much greater degree of stiffness in the flange portion to prevent curling and buckling and tearing out from under the heads of attaching tacks, the fabric used in gaskets of the prior art might be relatively light and cheap. However, to attain the necessary stiffness in the flange it has been necessary, prior to my present invention, to use a heavy and therefore expensive fabric; or to use an excess of the fabric in the flange, folding back a portion thereof on itself to form a three or four ply flange; or to provide the flange with a series of longitudinal parallel rows of stitches.

Practice of either of the first two methods of the prior art involves an evident expense which it is one object of my present invention to eliminate. The third method of the prior art is ineffectual to achieve the desired object because of the fact that a line of stitching serves to stiffen the material through which it passes only against bending stresses applied transversely of the line of stitching. When the gasket is applied and in use there can be no such transverse stresses, since the attaching tacks effectually hold the gasket down throughout its entire length. The tendency of the flange material to curl upwardly along the free edge of the flange is therefore left unimpaired by lines of stitching parallel with the edge.

In the prior art also, whatever the means employed to stiffen the flange, it has been necessary to run a line of stitching through the flange plies close to the line where they diverge to form the packing enclosing portion of the fabric, for the purpose of tightly retaining the packing in its cylindrical form.

It is an object of my present invention to provide the flange portions of gaskets of the character indicated with a novel type of stitching which may be cheaply and quickly applied and which will at once serve to stiffen and reinforce the flange and maintain the packing tightly in its cylindrical form.

In the accompanying drawings, which illustrate my present invention in several preferred forms of embodiment, and whereon like reference characters indicate the same parts in the several views, Figure 1 is a perspective view, shown in section at one end, of an elementary type of gasket constructed according to the principle of my present invention; and Figs. 2, 3, 4 and 5 are similar views of modified forms of gasket also embodying my present invention.

In the drawings, 1 designates a soft, fibrous packing of cotton or the like and preferably cylindrical in form. A waterproof fabric material, as for example oilcloth, completely envelopes the fabric, as shown at 2, to protect it from air and moisture, retain its shape, and, by being continued outwardly, as at 3, to form a flange or lap through which may be passed tacks or the like to secure the gasket in place against the door jamb. It will be obvious that, apart from the tacks which fasten the flange in operative position, additional fastening means must be passed through the component layers of the flange to hold them together. Furthermore, some fastening medium must pass through the flange layers close to the line where they diverge to encase the packing material, in order that the latter may be tightly confined against its tendency to be flattened out and spread in between the layers of the flange. And in addition, as pointed out hereinabove, the flange must be stiffened to provide an efficient gasket the flange of which will not buckle or curl and which will have sufficient "body" to prevent tearing past the heads of the attaching tacks.

I provide means for accomplishing all of these objects simply and inexpensively by disposing a zigzag or broken line of continuous stitching 4 from edge to edge across the flange, as shown in each of the figures. It will be clear that such stitching serves to reinforce the flange and prevent edge curling, because such curling would require the stitched material to lift in a direction substantially transverse to one or more of the short straight sections of the zigzag line of stitching. This type of stitching also serves to secure the component layers of the flange together. And since I prefer to bring the series of points 5, where the straight sections of the stitches change their direction along the inner edge of the flange, closely against the packing confining portion of the fabric, a separate line of stitching along this line to retain the packing tightly in its cylindrical form, is unnecessary. The opposite line of points 6 is disposed in close proximity to the outer edge of the flange to hold the plies tightly together along this outer edge.

In Figs. 2, 3, 4 and 5 I have shown various gaskets provided with various modified forms of flanges, to all of which my novel type of stitching 4 is applicable. Figs. 1 and 2 show a two-ply flange, a type which has heretofore met with but little favor in competition with the three- and four-ply flanges shown in the other figures because it lacked the desirable stiffness and "body" explained above. When configured with my zigzag line of stitching 4, however, I have found the two-ply flange, which requires less fabric in its manufacture and is consequently much cheaper to make, is just as efficient as the three- and four-ply types. The latter, shown in Figs. 3, 4 and 5, may also be provided with the zigzag line of stitching 4 when the fabric used is unusually light and/or when an exceptionally stiff flange is desired.

The zigzag line of stitching may be produced on a standard sewing machine provided with the customary guide attachment for this purpose, as is well known and understood by those familiar with the art. It is to be noted also that the production of the zigzag line of stitching requires but a single passage of the gasket through the sewing machine, as compared with the plurality of passages necessary to effect the several lines of stitching required by gaskets of the prior art.

It is to be understood, furthermore, that while I have characterized the stitching 4 as a zigzag line, it is by no means essential to the spirit of my invention that this stitching be a true single, continuous broken line, though I have found that this type of stitching is most practicable and most easily and quickly applied. The essence of the invention consists in producing in the flange portion of the fabric a series of lines of stitching which are substantially transverse of the length of the flange, and any form of such stitching is to be considered within the spirit of this invention in its broader aspects and therefore within the scope and purview of the appended claims.

Having thus described my invention, what I claim and wish to secure by Letters Patent is:

1. A gasket comprising a packing, a fabric covering therefor extending from one side of the packing to form a multi-ply tacking flange, and stitches passing through the flange at substantially right angles to the longitudinal edge thereof.

2. A gasket comprising a packing, a fabric covering therefor extending from one side of the packing to form a multi-ply tacking flange, and a zigzag line of stitching passing through the plies of the flange.

3. A gasket comprising a packing, a fabric covering therefor extending from one side of the packing to form a multi-ply tacking flange, and a single line of stitching disposed in zigzag configuration across the flange, the inner points thereof lying along the extreme inner edge of the tacking flange to confine the packing in the fabric covering.

4. A gasket comprising a packing, a fabric covering therefor, portions of the covering extending outwardly from one side of the packing to form a multi-ply tacking flange, and a zigzag line of stitching passing through the plies of the flange, the outer points thereof being in close proximity to the outer edge of the flange.

5. A gasket comprising a packing, a fabric covering therefor, portions of the covering extending outwardly from one side of the packing to form a multi-ply tacking flange, and a zigzag line of stitching passing through the plies of the flange, the inner points thereof lying along the extreme inner edge of the tacking flange to confine the packing in the fabric covering, and the outer points thereof being in close proximity to the outer edge of the flange to hold the plies tightly together along the outer edge of the flange.

In testimony whereof I affix my signature.

ROBERT C. SCHEMMEL.